United States Patent
Bruns

(10) Patent No.: US 12,279,995 B2
(45) Date of Patent: Apr. 22, 2025

(54) APPARATUS FOR PROTECTING THE SAFETY OF PERSONS WITH RESTRICTED MOBILITY IN A VEHICLE

(71) Applicant: Bruns Holding Gmbh & Co. KG, Apen (DE)

(72) Inventor: Gerit Bruns, Bad Zwischenahn (DE)

(73) Assignee: Bruns Holding Gmbh & Co. KG, Apen (DE)

( * ) Notice: Subject to any disclaimer, the term of this patent is extended or adjusted under 35 U.S.C. 154(b) by 0 days.

(21) Appl. No.: 18/111,003

(22) Filed: Feb. 17, 2023

(65) Prior Publication Data

US 2024/0033144 A1  Feb. 1, 2024

(30) Foreign Application Priority Data

Jul. 29, 2022  (DE) .......................... 202022104341.8

(51) Int. Cl.
*B60N 2/874* (2018.01)
*A61G 3/00* (2006.01)
(Continued)

(52) U.S. Cl.
CPC ............ *A61G 3/006* (2013.01); *B60N 2/874* (2018.02); *B60R 21/02* (2013.01); *B60R 2021/006* (2013.01); *B60R 2021/0293* (2013.01)

(58) Field of Classification Search
CPC ........ A61G 3/006; B60N 2/874; B60N 2/806; B60N 2/865; B60N 2/888; B60R 21/02; B60R 2021/0293; B60R 2021/006
See application file for complete search history.

(56) References Cited

U.S. PATENT DOCUMENTS

| 10,994,641 B2 * | 5/2021 | Kang | ................... B60N 2/868 |
| 11,117,503 B2 * | 9/2021 | Sosa | ................... B60N 2/809 |

(Continued)

FOREIGN PATENT DOCUMENTS

| CH | 698591 B1 | 9/2009 |
| DE | 20213310 U1 | 1/2004 |

(Continued)

OTHER PUBLICATIONS

Jeong, May 27, 2014, KR 101390414 B1, Machine Translation of Specification.*

(Continued)

*Primary Examiner* — Paul N Dickson
*Assistant Examiner* — Matthew Joseph Ganci
(74) *Attorney, Agent, or Firm* — Wood Herron & Evans LLP

(57) ABSTRACT

An apparatus is provided for protecting the safety of persons, in particular wheelchair users, in a vehicle. The apparatus includes a headrest and/or backrest, and at least one holder, to which the headrest and/or backrest is attached, for holding the headrest and/or backrest. The holder is adapted to change the horizontal distance ($X_K$) of the headrest and/or the horizontal distance ($X_R$) of the backrest in the direction of travel from the person. Advantageously, the holder includes at least one cushioning device for cushioning the impact of a person or a wheelchair against the headrest and/or backrest.

14 Claims, 5 Drawing Sheets

(51) Int. Cl.
  *B60R 21/02*   (2006.01)
  *B60R 21/00*   (2006.01)

(56)          References Cited

U.S. PATENT DOCUMENTS

2011/0204688 A1*  8/2011  Undevik ............... B60N 2/245
                                                    296/65.04
2013/0328340 A1* 12/2013  Bruns .................... B60N 2/245
                                                    296/65.01
2020/0113754 A1*  4/2020  Girardin ................ B60N 2/245

FOREIGN PATENT DOCUMENTS

DE     102020205142 A1 * 10/2021
EP         0963872 A2 * 12/1999   ......... B60N 2/42709
EP         2583649 B1    8/2014
KR        101390414 B1 *  5/2014   .............. A61G 3/08
WO       20200077242 A1    4/2020

OTHER PUBLICATIONS

Sohnel, Oct. 28, 2021, DE-102020205142-A1, Machine Translation of Specification.*
Sinnhuber, EP 0963872 A2, Machine Translation of Specification (Year: 1999).*
European Patent Office, Search Report issued is EP 22205719.2, dated May 25, 2023, with English Translation (16 pages).
German Patent Office, Search Report issued in DE 20 2022 104 341.8, dated Apr. 4, 2023, with English Translation (7 pages).

* cited by examiner

APPARATUS FOR PROTECTING THE SAFETY OF PERSONS WITH RESTRICTED MOBILITY IN A VEHICLE

CROSS-REFERENCE TO RELATED APPLICATION

This application claims priority to German Application No. DE 20 2022 104 341.8, filed Jul. 29, 2022. The above-mentioned patent application is incorporated herein by reference in its entirety.

TECHNICAL FIELD

This application relates to an apparatus for protecting the safety of persons with restricted mobility, in particular wheelchair users, in a vehicle, specifically which includes a headrest and/or backrest and at least one holder. This application also relates to a vehicle having an apparatus as described above and which is anchored to a floor or a side wall of the vehicle.

BACKGROUND

In order to protect the safety of persons in vehicles, in particular persons with restricted mobility, various belt systems, seat backs and rail systems are used in which the person to be protected generally remains in his or her wheelchair, and the wheelchair is connected to the vehicle via the restraint systems.

The basic problem here is that in the event of a collision, particularly in the case of a rear-end collision in the direction of travel, a rebound event may occur in which the person and the wheelchair are accelerated in the opposite direction to the direction of impact. This causes the person to hit any headrest and/or backrest with his or her head and/or back, which may result in additional damage to health.

To prevent such health risks, an invention comprising a "rear excursion backrest for wheelchair accessible vehicles" is known from the prior art and disclosed in International PCT Application No. WO 2020/077242. The latter discloses a "moveable backrest" having a "ratchet and pawl mechanism" which is adapted to ensure, in the event of an impact, that a backrest or headrest follows a person moving forwards and prevents rearward movement of the person in a "rebound". The ratchet and pawl mechanism described requires a complex apparatus.

Thus, it would be desirable to provide an apparatus with which the impact of a person or of a wheelchair is cushioned in the region of the headrest and/or backrest, advantageously for the person, by relatively simple means, in particular in the event of an impact caused by a rebound event.

SUMMARY

These and other technical objects and problems are addressed by the embodiments provided in this invention. To this end, according to a first set of embodiments, a holder is provided having at least one cushioning device for cushioning an impact of a person or a wheelchair against the headrest and/or backrest.

The cushioning device preferably acts in the vehicle's direction of travel and is based on the realization that tried and tested cushioning devices and mechanisms for protecting the safety of persons are used for persons with restricted mobility, in particular. By cushioning the impact, it is possible to reduce the risk of injury to a person. The cushioning device according to embodiments of the invention is advantageously integrated into the holder.

According to a development of the invention, the at least one cushioning device is adapted to cushion the impact of the wheelchair user or the wheelchair against the headrest and/or backrest in the event of the vehicle being involved in a collision, in particular in a collision in or against the direction of travel, and on the subsequent rebound. According to the invention, the cushioning device serves firstly to cushion, immediately at the moment of collision, in particular a collision in the direction of travel, the impact against and/or the pressure exerted on the headrest and/or backrest as a result of the inertia of the person or the wheelchair, and it serves secondly to cushion the impact of the persons or the wheelchair against the headrest and/or backrest after the rebound event.

According to a development of the invention, the apparatus includes a pillar. According to another development of the invention, the at least one holder is attached to the pillar.

According to a preferred embodiment of the invention, the apparatus includes at least one pivoted arm to which the at least one holder is attached, the holders of the headrest and the backrest each being preferably attached to a separately pivoted arm, and the at least one pivoted arm being attached to the pillar. Due to the at least one pivoted arm, the apparatus has more degrees of freedom, thus ensuring more flexible handling and adjustability.

According to an advantageous alternative embodiment of the invention, the at least one pivoted arm is telescopic. According to another development of the invention, the at least one pivoted arm is pivoted about a vertical axis. The ability of the at least one pivoting arm to telescope and to pivot about a vertical axis allows a further increase in the flexibility and adjustability of the headrest and/or backrest, particularly in the horizontal direction.

According to one embodiment of the invention, the holder includes at least one height adjustment mechanism which is adapted to position the headrest and/or backrest (6) at a particular height. The adjustability of the headrest and/or backrest in the vertical direction allows the latter to be adjusted more precisely to the head and back position of the person to be protected.

According to a development of the invention, the apparatus includes an anchoring element for anchoring it to the floor of the vehicle by at least one plate having a plurality of openings for passing through bolts and/or fasteners for locking it form-fittingly to the vehicle.

According to a development of the invention, the at least one cushioning device includes a cushioning member. The cushioning member serves to absorb the energy transmitted during the collision, in such a way that the negative acceleration that results from the deformation of the cushioning member and that produces the forces acting on the persons during the collision is less in amount than in the case of an impact against a member that is non-deformable or only slightly deformable. The forces acting on the person are therefore less when a cushioning member is present.

According to a development of the invention, the cushioning device includes a ratchet which is adapted to resist the movement of the headrest and/or backrest up to a load limit that is less than the load produced on the headrest and/or backrest during an impact or rebound. The ratchet thus ensures that it is only in the event of an impact that the cushioning device is put under a load and absorbs the energy of the person or wheelchair impacting against it. This is particularly important in the case of non-reversible movements or deformations of cushioning members.

According to a development of the invention, the holder consists of hollow profiles.

According to a development of the invention, the cushioning member is disposed inside the holder.

According to a further set of embodiments, a vehicle is provided for transporting persons, in particular wheelchair users, comprising a vehicle structure and an apparatus, according to at least one of the preceding developments/embodiments of the invention, that can be anchored to said vehicle structure. In this regard, the vehicle makes use of the same advantages and realizations as the apparatus according to the first set of embodiments, so reference is made in that respect to the description above in order avoid repetition.

According to a development of the invention according to the second set of embodiments, the apparatus is anchored to a floor or a side wall of the vehicle.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one of more embodiments of the invention and, together with the general description given above and the detailed description given below, explain the one or more embodiments of the invention.

DETAILED DESCRIPTION

Figure 1:
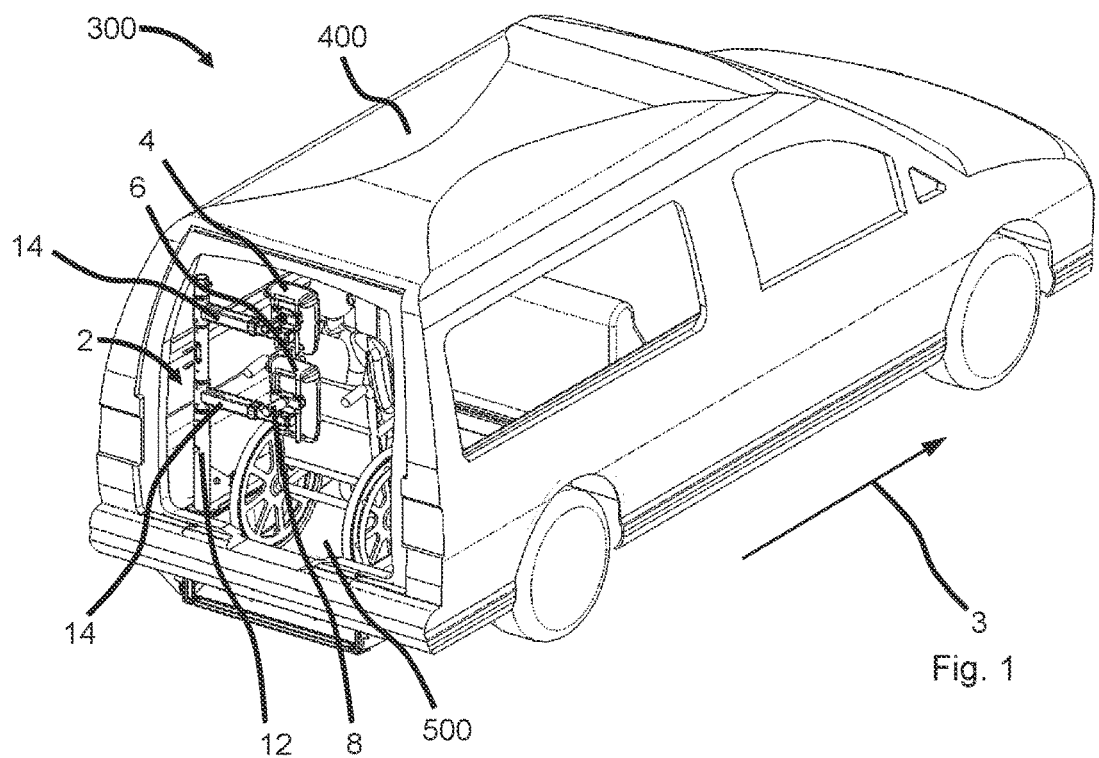
FIG. 1 is a schematic top perspective view of the vehicle with a person sitting in a wheelchair and with the apparatus according to a preferred embodiment that can be anchored to the vehicle structure, aligned in a protective position.

FIG. 1 shows a vehicle 300 for transporting persons 100, in particular wheelchair users, having a vehicle structure 400 and an apparatus 2 according to a preferred embodiment that can be anchored to vehicle structure 400. A person 100 sitting in a wheelchair 200 is secured inside vehicle structure 400 and on vehicle floor 500 via the wheelchair. Apparatus 2, having a head restraint 4 and a backrest 6, is aligned in a protective position. The apparatus has two pivoted arms 14 and a pillar 12 (also referred to as column 12), wherein arms 14 are rotatably attached to column 12. Column 12, for its part, is anchored to vehicle structure 400. Reference sign 3 illustrates with an arrow the general direction of travel of vehicle 300, the longitudinal axis of the vehicle extending parallel to the arrow.

Figure 2:
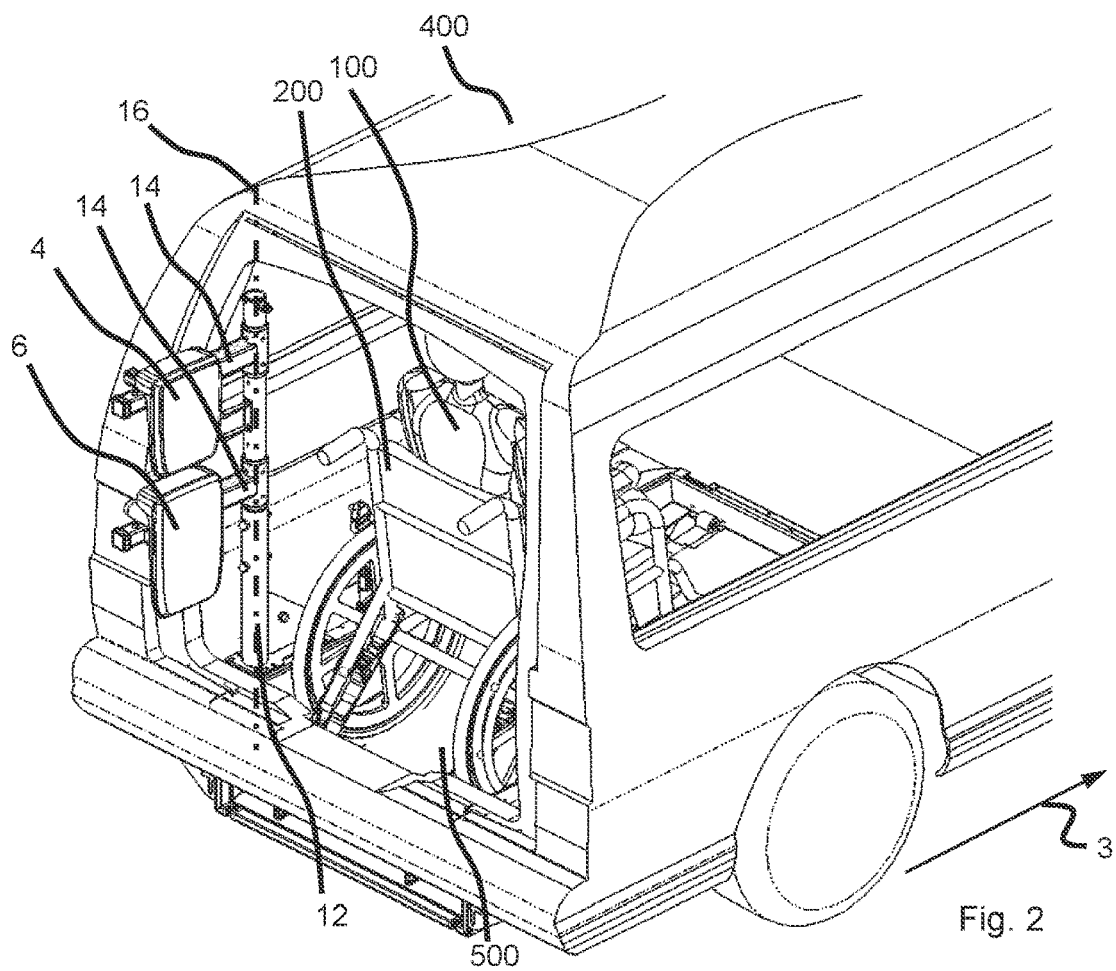
FIG. 2 is a schematic top perspective view of the rear section of the vehicle shown in FIG. 1, with the apparatus in an open position.

FIG. 2 shows the rear section of the vehicle 300 shown in FIG. 1, with apparatus 2 in an open position. In the open position shown here, the two pivoted arms 14, to which headrest 4 and backrest 6 are attached, are rotated approximately 90° about a vertical axis 16 relative to the protective position.

Figure 3:
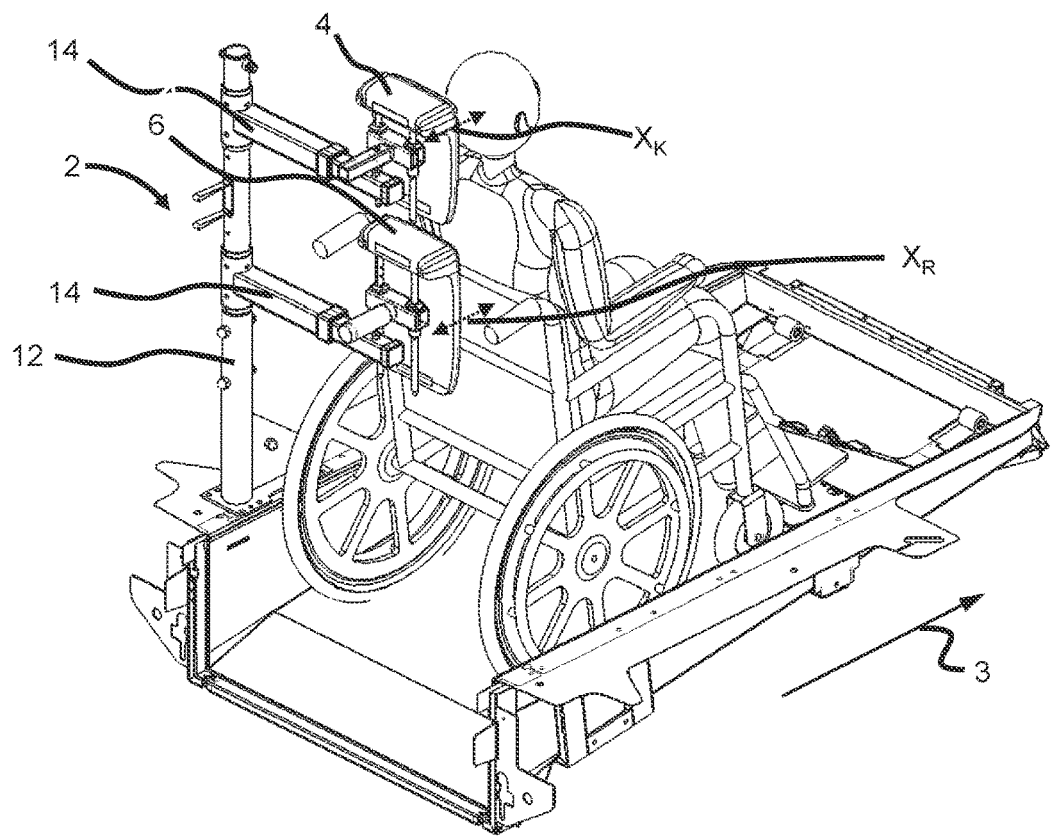
FIG. 3 is a schematic top perspective view of the inner lower vehicle structure with the person sitting in a wheelchair and with the apparatus according to the preferred embodiment that can be anchored to the vehicle structure, aligned in a protective position.

FIG. 3 shows the inner lower vehicle structure 400 of the rear section of vehicle 300 according to the embodiment. Here, apparatus 2 is aligned in a protective position. In FIGS. 1 and 2, the person 100 sitting in wheelchair 200, and wheelchair 200 itself, are secured inside the vehicle structure, or anchored to the vehicle floor, respectively. The headrest is at a horizontal distance ($X_K$) and the backrest at a horizontal distance ($X_R$) from the person.

Figure 4:
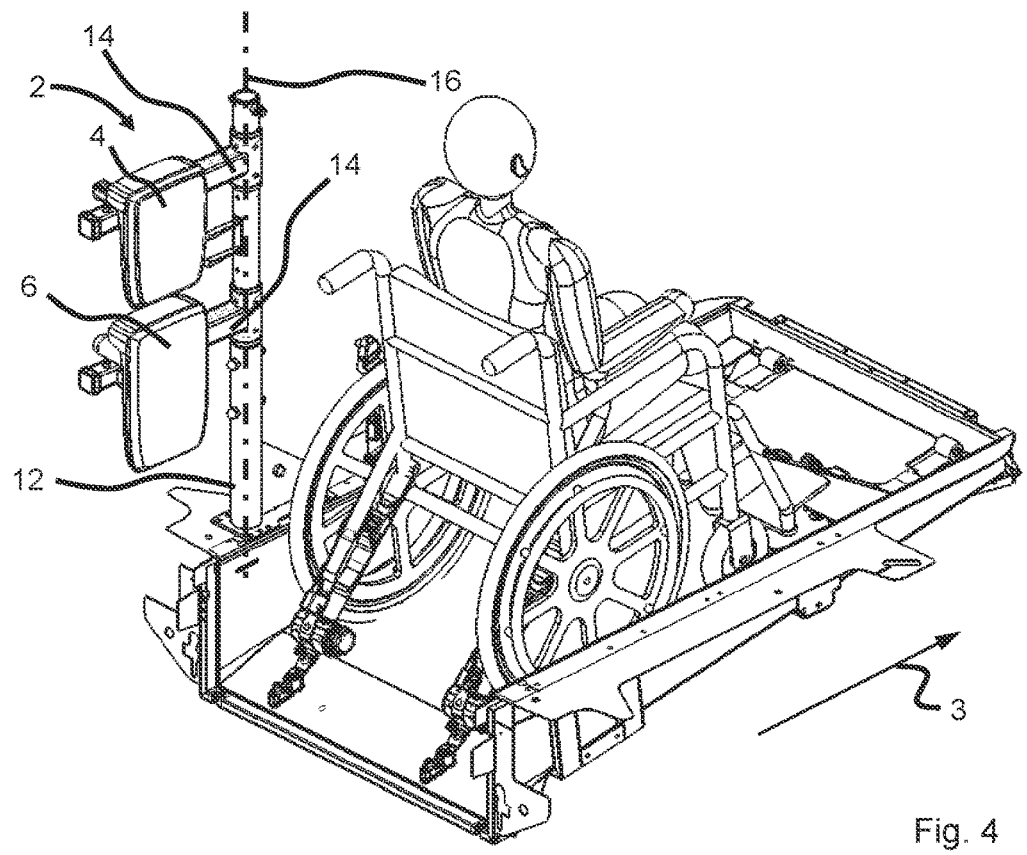
FIG. 4 is a schematic top perspective view of the inner lower vehicle structure with the person sitting in a wheelchair and with the apparatus according to the preferred embodiment in the open position.

Analogously to FIG. 2, FIG. 4 shows apparatus 2 in the open position, the two pivoted arms 14 having been rotated approximately 90° about vertical axis 16.

Figure 5:
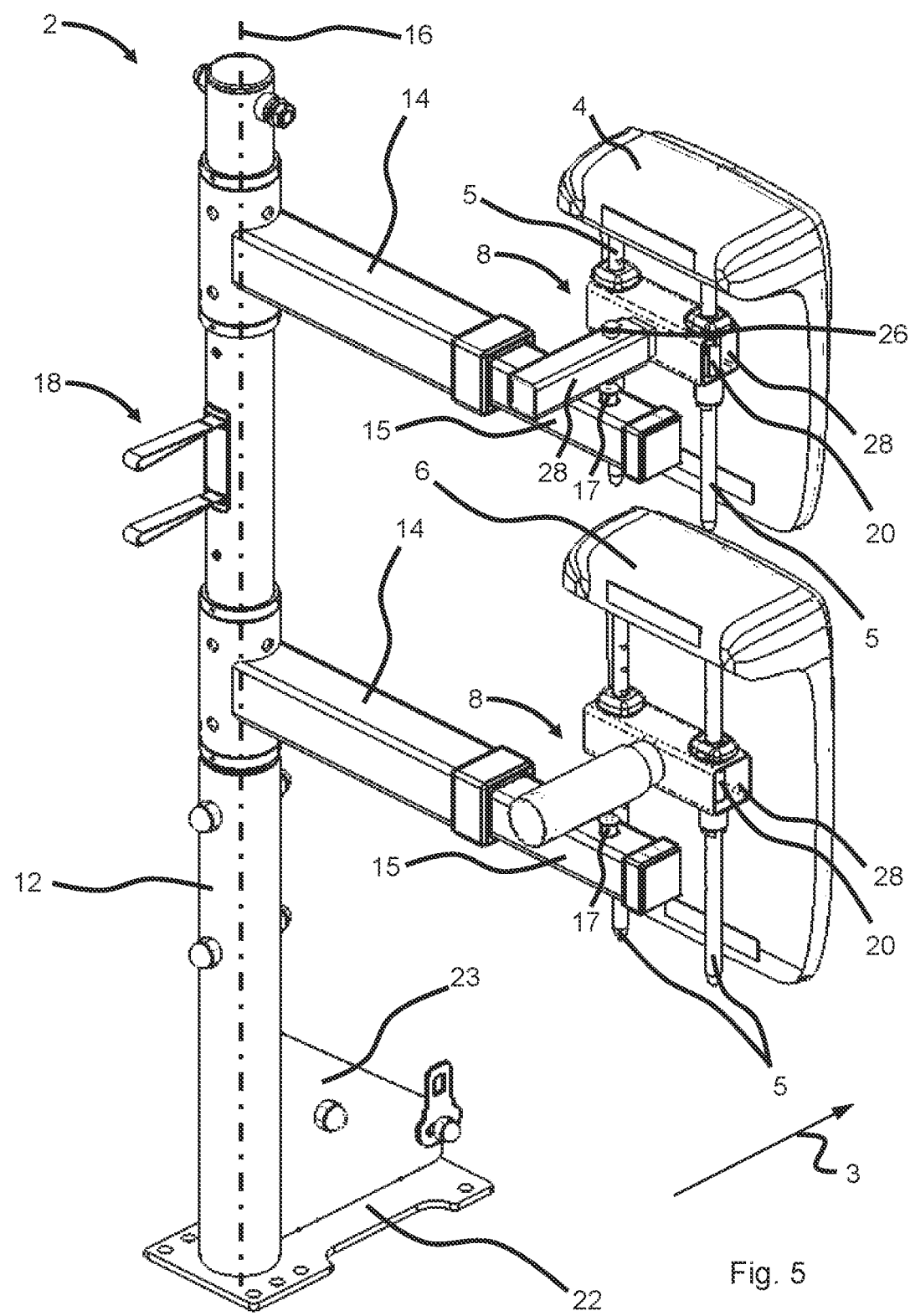
FIG. 5 is a detailed top perspective view of the apparatus according to the preferred embodiment.

FIG. 5 shows an enlarged view of apparatus 2 according to the embodiment, with two pivoted telescopic arms 14. There are two locking devices 18 on column 12, one for each of arms 14 and which have to be released in order to pivot the associated arm 14 about column 12. Column 12, and apparatus 2, is designed to be connectable to the vehicle structure via a fastening plate 22, which serves as an anchoring element. In operation, fastening plate 22 is securely anchored to the vehicle structure, such as via pass through of bolts and/or fasteners. Column 12 is additionally fixed by a stiffening plate 23 to fastening plate 22.

Each of the pivoted telescopic arms 14 has a telescopic profile 15. Telescopic profiles 15 can each be pushed in the longitudinal direction into and out of the associated arm 14. Telescopic profiles 15 each have a fixing device for a telescopic profile, for fixing the pulled-out position. Holders 8 for holding the headrest 4 and backrest 6 are each attached to arms 14 and telescopic profiles 15. Holders 8 are adapted to change the horizontal distances of headrest 4 and backrest 6 ($X_K$, $X_R$) from the person in direction of travel 3. The vertical position of the headrest 4 and backrest 6 can be adjusted to the person via height adjustment mechanisms 20. Headrest 4 and backrest 6 are adjusted horizontally by telescoping pivoted arms 14 and by retracting and pulling out telescopic profiles 15 and via the aforementioned holders 8.

Holders 8 each comprise, inter alia, hollow profiles 28, or have such hollow profiles, in combination with other components. In the embodiment shown here, holders 8 have, inter alia, T-shaped constructions 28, wherein each of the hollow profiles 28 extending transversely to the direction of travel has holes for receiving headrest 4 and backrest 6, respectively. Headrest 4 and backrest 6 each have rods 5 extending perpendicularly on the rear side and which are inserted into the holes. The holder 8 of headrest 4, or the cushioning device of headrest 4, has a ratchet 26 that resists the movement of headrest 4 up to a load limit $F_{Grenz}$ that is less than the load produced on headrest 4 and/or backrest 6 during an impact or rebound.

Figure 6:
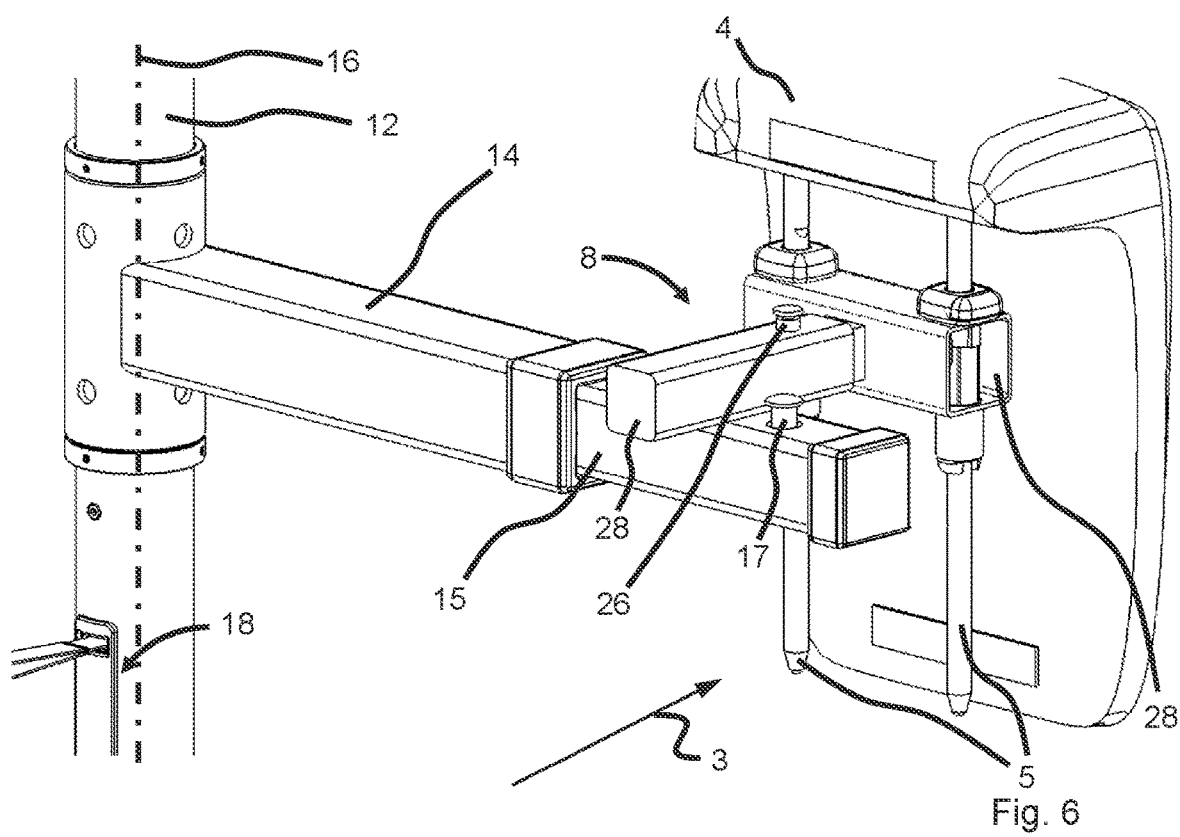
FIG. 6 is an enlarged view of the arm and the headrest holder shown in FIG. 5.

FIG. 6 shows an enlarged view of arm 14 and the holder 8 of headrest 4, with hollow profiles 28 according to the embodiment. When the pivoted arm 14 and headrest 4 are in the position for protecting person 100, as can be seen in FIG. 6, a force is exerted on holder 8 and cushioning device 10 in the event of an impact, in particular an impact in the direction of travel 3 or in the opposite direction.

Figure 7:
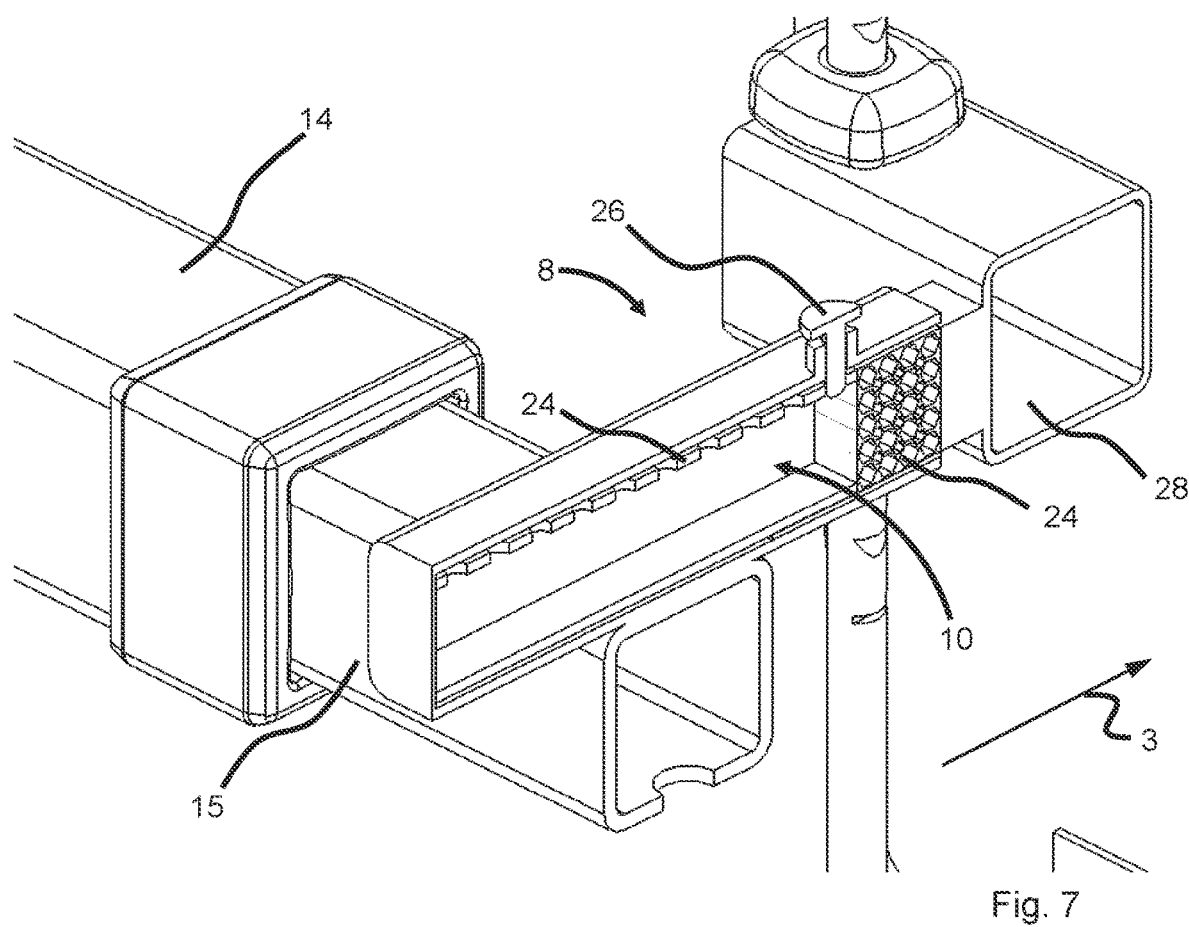
FIG. 7 shows a detail in the region of the headrest holder, including a partial cross-sectional view of the holder according to the preferred embodiment.

FIG. 7 shows a detail in the region of the holder 8 of the headrest 4 of apparatus 2 according to the embodiment, as a cross-sectional view of holder 8 and its associated arm 14. In the event of an impact, in particular an impact in the direction of travel 3 or in the opposite direction, ratchet 26 is overcome due to a force greater than load limit ($F_{Grenz}$) acting upon it. This causes deformation of cushioning member 24 shown here, and to the energy produced by the impact being converted inside cushioning member 24 into deformation energy, with cushioning device 10 being pushed together in the opposite direction to the direction of travel.

Figure 8:
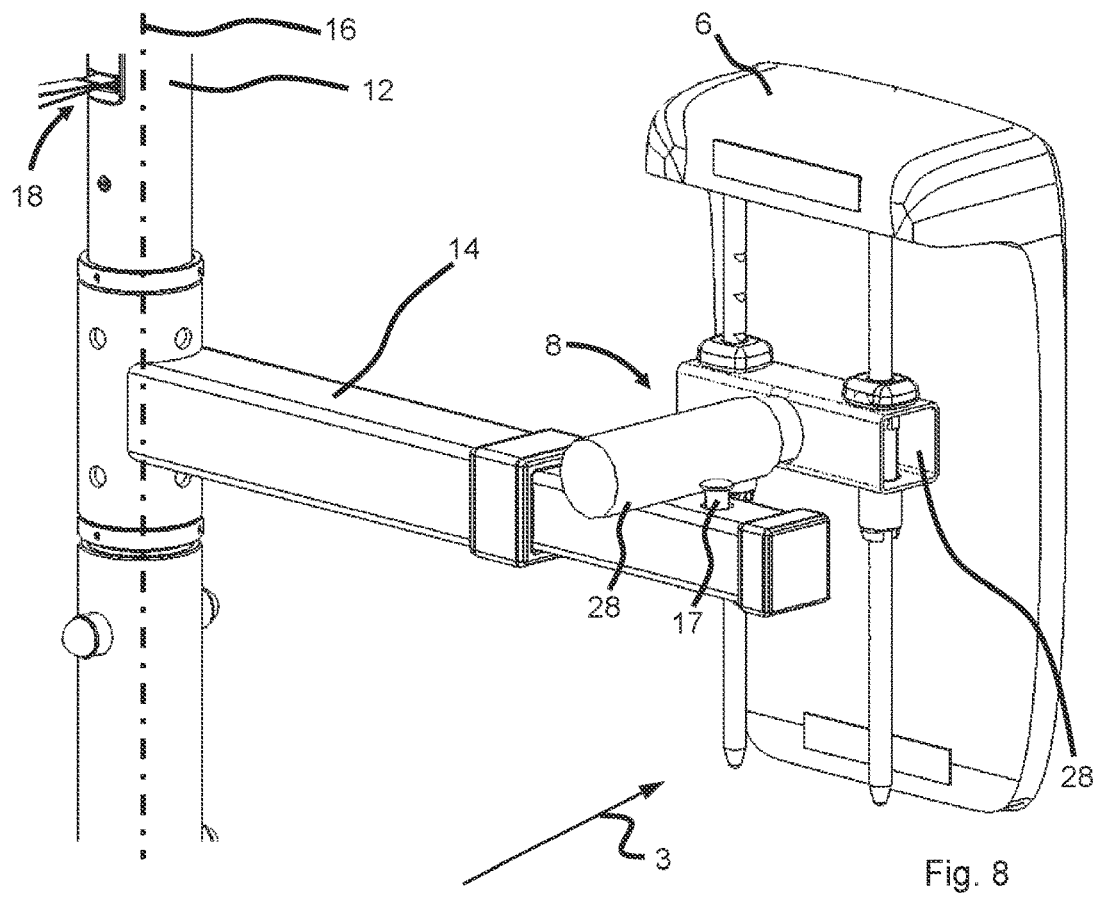
FIG. 8 is an enlarged view of the arm and backrest holder shown in FIG. 5.

Analogously to the Figures described above, FIG. 8 shows an enlarged view of arm 14 and the holder 8 of backrest 6, with hollow profiles 28 according to the embodiment.

Figure 9:
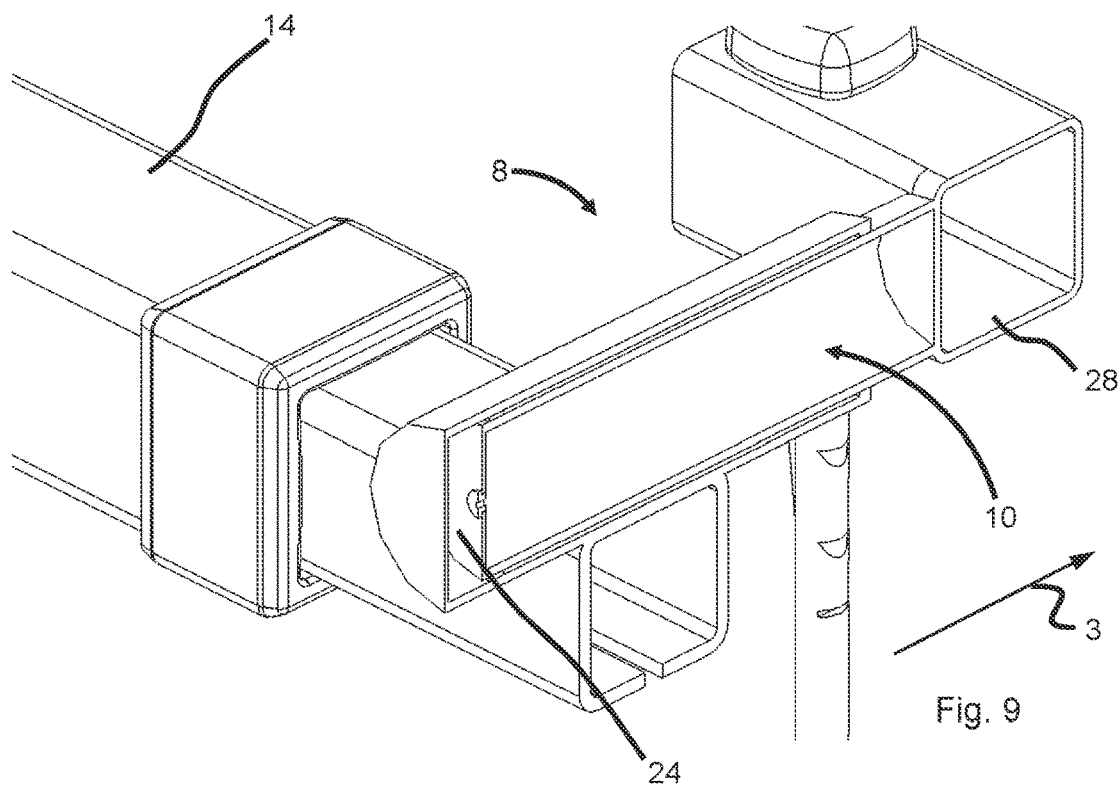
FIG. 9 shows a detail in the region of the backrest holder, including a partial cross-sectional view of the holder according to the preferred embodiment.

FIG. 9 shows, analogously to FIG. 7, a further enlarged detail in the region of the holder 8 of the backrest 6 of apparatus 2. In the event of a collision, cushioning is performed by a cushioning member 24 provided in the form of an air-pressure spring, cushioning device 10 and the air-pressure spring being pushed together in the opposite direction to the direction of travel.

The embodiments described above are only descriptions of preferred embodiments of the present invention and are not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. An apparatus for protecting the safety of a person in a vehicle, comprising:
    a headrest and/or backrest;
    at least one holder, to which the headrest and/or backrest is attached, for holding the headrest and/or backrest,
    wherein the holder is adapted to change a horizontal distance ($X_K$) of the headrest and/or a horizontal distance ($X_R$) of the backrest in a direction of travel from the person, and
    wherein the holder includes at least one cushioning device for cushioning an impact of the person or a wheelchair against the headrest and/or backrest,
    wherein the at least one cushioning device includes a cushioning member which is adapted to resist a movement of the headrest and/or backrest up to a load limit ($F_{Grenz}$) that is less than a load produced on the headrest and/or backrest during an impact or rebound
    wherein the apparatus includes at least one pivoted arm to which the at least one holder is attached, the holders of the headrest and the backrest each being attached to a separately pivoted arm, and the at least one pivoted arm being attached to a pillar.

2. The apparatus of claim 1, wherein the at least one cushioning device is adapted to cushion an impact of the person or the wheelchair against the headrest and/or backrest in the event of the vehicle being involved in a collision and on a subsequent rebound.

3. The apparatus of claim 1, wherein the at least one holder is attached to the pillar.

4. The apparatus of claim 1, wherein the at least one pivoted arm is telescopic.

5. The apparatus of claim 1, wherein the at least one pivoted arm is pivoted about a vertical axis.

6. The apparatus of claim 4, wherein the at least one pivoted arm is pivoted about a vertical axis.

7. The apparatus of claim 1, wherein the holder includes at least one height adjustment mechanism which is adapted to position the headrest and/or backrest at a particular height.

8. The apparatus of claim 1, wherein the apparatus includes an anchoring element for anchoring it to a floor of the vehicle, comprising at least one plate having a plurality of openings for passing through bolts and/or fasteners for locking the at least one plate form-fittingly to the vehicle.

9. The apparatus of claim 1, wherein the cushioning device includes one of a ratchet and an air-pressure spring, either of which resists the movement of the headrest and/or backrest up to the load limit ($F_{Grenz}$).

10. The apparatus of claim 1, wherein the holder has hollow profiles.

11. The apparatus of claim 10, wherein the cushioning member is disposed inside the holder.

12. An apparatus for protecting the safety of a person in a vehicle, comprising:
    a headrest and/or backrest;
    at least one holder, to which the headrest and/or backrest is attached, for holding the headrest and/or backrest,
    wherein the holder is adapted to change a horizontal distance ($X_K$) of the headrest and/or a horizontal distance ($X_R$) of the backrest in a direction of travel from the person, and
    wherein the holder includes at least one cushioning device for cushioning an impact of the person or a wheelchair against the headrest and/or backrest,
    wherein the at least one cushioning device is adapted to cushion an impact of the person or the wheelchair against the headrest and/or backrest in the event of the vehicle being involved in a collision and on a subsequent rebound;
    the apparatus includes a pillar;
    the at least one holder is attached to the pillar;
    the apparatus includes at least one pivoted arm to which the at least one holder is attached, the holders of the headrest and the backrest each being attached to a separately pivoted arm, and the at least one pivoted arm being attached to the pillar;
    the at least one pivoted arm is telescopic;
    the at least one pivoted arm is pivoted about a vertical axis;
    the holder includes at least one height adjustment mechanism which is adapted to position the headrest and/or backrest at a particular height;
    the apparatus includes an anchoring element for anchoring it to a floor of the vehicle, comprising at least one plate having a plurality of openings for passing through bolts and/or fasteners for locking the at least one plate form-fittingly to the vehicle;
    the at least one cushioning device includes a cushioning member;
    the cushioning device includes a ratchet which is adapted to resist a movement of the headrest and/or backrest up to a load limit ($F_{Grenz}$) that is less than a load produced on the headrest and/or backrest during an impact or rebound;
    the holder has hollow profiles; and
    the cushioning member is disposed inside the holder.

13. A vehicle for transporting wheelchair users, comprising a vehicle structure and the apparatus of claim 1 that is anchored to the vehicle structure.

14. The vehicle of claim 13, wherein the apparatus is anchored to a floor or a side wall of the vehicle.

\* \* \* \* \*